No. 652,663. Patented June 26, 1900.
E. C. BURR.
SULFURATION TANK.
(Application filed Nov. 27, 1899.)
(No Model.)
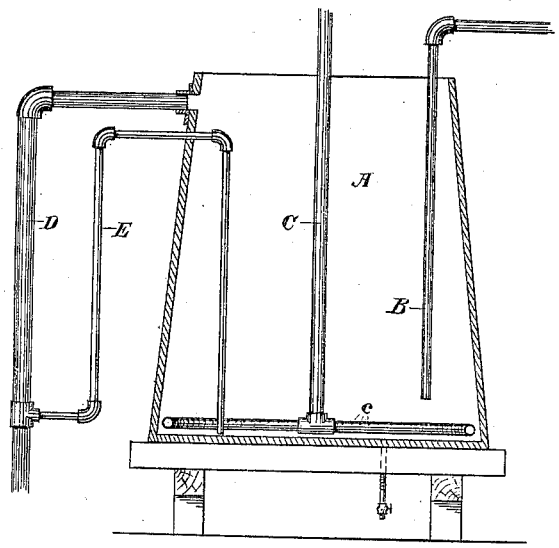
Witnesses
Walter F. Vans,
D. B. Richards
Inventor
Edmund C. Burr,
by Wm F. Booth,
his Attorney,

UNITED STATES PATENT OFFICE.

EDMUND C. BURR, OF SAN FRANCISCO, CALIFORNIA, ASSIGNOR OF TWO-THIRDS TO JOHN C. H. STUT, OF OAKLAND, AND JOHN W. ATKINSON, OF SANTA MARIA, CALIFORNIA.

SULFURATION-TANK.

SPECIFICATION forming part of Letters Patent No. 652,663, dated June 26, 1900.

Application filed November 27, 1899. Serial No. 738,408. (No model.)

*To all whom it may concern:*

Be it known that I, EDMUND C. BURR, a citizen of the United States, residing in the city and county of San Francisco, State of California, have invented certain new and useful Improvements in Sulfuration-Tanks in Sugar-Factories; and I do hereby declare the following to be a full, clear, and exact description of the same.

My invention relates to continuously-supplied tanks, and especially to the tanks in sugar-factories, in which the juice from the filter-presses is treated with sulfurous-acid gas.

The object of my invention is to avoid oversaturation of the juice with the gas when for any reason the supply of the former is temporarily checked while that of the latter proceeds.

My invention consists in a means, in connection with the sulfuration-tanks, for automatically depleting or emptying them when the supply ceases, so that at no time can a tank full of the juice be supersaturated by a continuous accession of the gas.

Referring to the accompanying drawing, the figure is a sectional elevation of my sulfuration-tank.

A is a sulfuration-tank of the usual general construction.

B is the pipe which supplies the tank A with juice.

C is the pipe which supplies the sulfurous-acid gas, the latter being discharged from the perforated portion *c* near the bottom of the tank.

D is an overflow-outlet for the juice from tank A.

E is a siphon-pipe from tank A, the head of said pipe being on a level below that of the overflow-pipe D. This siphon-pipe may terminate exteriorly at any suitable point; but in practice it is best to enter it into the overflow-pipe D, as shown.

The operation is as follows: The juice fills tank A and is treated with the sulfurous-acid gas. When the juice reaches the level of the overflow-pipe D, it will pass out through said pipe and will at the same time pass out through siphon E, and this flow continues as long as the juice is kept supplied to tank A, it being understood that the supply is greater than the capacity of the siphon-pipe. When now, as sometimes happens, the supply of juice is cut off and the supply of gas continues, there is danger of oversaturation to that portion of the juice which remains in tank A; but with my apparatus no juice can remain in tank A after the supply ceases, for it will all be siphoned off through pipe E, and this being done automatically no attention need be paid to a contingency which heretofore had always to be anticipated.

Having thus described my invention, what I claim as new, and desire to secure by Letters Patent, is—

1. In combination with a continuously-supplied tank, an overflow-pipe from said tank, and a siphon-pipe from said tank, the head of which is lower than the level of the overflow-pipe, whereby when the supply ceases, the contents of the tank will siphon off.

2. In combination with a continuously-supplied tank, an overflow-pipe from said tank, and a siphon-pipe from said tank, the head of which is lower than the level of the overflow-pipe, whereby when the supply ceases, the contents of the tank will siphon off, the outer leg of said siphon-pipe communicating with the overflow-pipe.

3. In combination with a sulfuration-tank in a sugar-factory, having suitable inlets for the juice and the gas, an overflow-pipe from said tank, and a siphon-pipe therefrom the head of which is below the level of the overflow-pipe.

4. In combination with a sulfuration-tank in a sugar-factory, having suitable inlets for the juice and the gas, an overflow-pipe from said tank and a siphon-pipe therefrom, the head of said pipe being below the level of the overflow-pipe and its outer leg in communication therewith.

In witness whereof I have hereunto set my hand.

EDMUND C. BURR.

Witnesses:
D. B. RICHARDS,
WALTER F. VANE.